US012754351B2

(12) United States Patent
Fukushima et al.

(10) Patent No.: US 12,754,351 B2
(45) Date of Patent: Oct. 6, 2026

(54) LAMINATE AND LIGHT DIFFUSION CONTROL FILM

(71) Applicant: LINTEC CORPORATION, Tokyo (JP)

(72) Inventors: Hiroki Fukushima, Tokyo (JP); Tatsuki Kuramoto, Tokyo (JP); Baku Katagiri, Tokyo (JP); Kentaro Kusama, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 579 days.

(21) Appl. No.: 18/111,171

(22) Filed: Feb. 17, 2023

(65) Prior Publication Data

US 2023/0266510 A1 Aug. 24, 2023

(30) Foreign Application Priority Data

Feb. 21, 2022 (JP) ................................ 2022-025041

(51) Int. Cl.
*G02B 5/02* (2006.01)
*B32B 7/12* (2006.01)
(Continued)

(52) U.S. Cl.
CPC .......... *G02B 5/0236* (2013.01); *B32B 27/308* (2013.01); *G02B 5/003* (2013.01);
(Continued)

(58) Field of Classification Search
CPC ........ G02B 5/0236; G02B 5/003; G02B 5/02; G02B 5/22; G02B 1/04; B32B 7/12; B32B 27/08; B32B 27/18; B32B 27/36; B32B 2255/10; B32B 2255/205; B32B 2255/26; B32B 2307/414; B32B 2307/71
See application file for complete search history.

(56) References Cited

U.S. PATENT DOCUMENTS 11,467,323 B2 * 10/2022 Kuramoto ................ G02B 1/04
11,630,248 B2 * 4/2023 Kuramoto ............ G02B 5/0278
359/599

(Continued)

FOREIGN PATENT DOCUMENTS

JP 6414883 10/2018
JP 2018-205517 A 12/2018

OTHER PUBLICATIONS

Notice of Reasons for Refusal, dated Jan. 6, 2026, that issued in corresponding Japanese Patent Application No. 2022-025041, along with English translation thereof.

*Primary Examiner* — Ricky L Mack
*Assistant Examiner* — Natasha Nigam
(74) *Attorney, Agent, or Firm* — Greenblum & Bernstein, P.L.C.

(57) ABSTRACT

A laminate used under an environment irradiated with external light includes a light diffusion control film having an internal structure in the film. The internal structure includes a plurality of regions having a relatively high refractive index in a region having a relatively low refractive index. The laminate further includes an ultraviolet absorbing layer located further on the external light incident side than the light diffusion control film. The light diffusion control film contains a weakly basic hindered amine-based compound having a carbonate skeleton.

11 Claims, 2 Drawing Sheets

(51) Int. Cl.

| | |
|---|---|
| ***B32B 27/08*** | (2006.01) |
| ***B32B 27/18*** | (2006.01) |
| ***B32B 27/30*** | (2006.01) |
| ***B32B 27/36*** | (2006.01) |
| ***G02B 5/00*** | (2006.01) |

(52) U.S. Cl.

CPC ................. *B32B 7/12* (2013.01); *B32B 27/08* (2013.01); *B32B 27/18* (2013.01); *B32B 27/304* (2013.01); *B32B 27/36* (2013.01); *B32B 2250/40* (2013.01); *B32B 2255/10* (2013.01); *B32B 2255/205* (2013.01); *B32B 2255/26* (2013.01); *B32B 2307/414* (2013.01); *B32B 2307/71* (2013.01); *B32B 2457/20* (2013.01)

(56) References Cited

U.S. PATENT DOCUMENTS

| | | | | |
|---|---|---|---|---|
| 2007/0116916 | A1* | 5/2007 | Ito | G02F 1/133606 428/46 |
| 2009/0111699 | A1* | 4/2009 | Negishi | C07D 211/94 524/99 |
| 2010/0245738 | A1* | 9/2010 | Nishihara | G02B 5/0236 349/112 |
| 2015/0378069 | A1* | 12/2015 | Yamamoto | B32B 27/08 359/361 |
| 2016/0018571 | A1* | 1/2016 | Kusama | G02B 5/0257 252/582 |
| 2016/0077246 | A1* | 3/2016 | Kusama | G02B 5/0268 359/599 |
| 2019/0033504 | A1* | 1/2019 | Miyata | B32B 27/42 |
| 2021/0055459 | A1* | 2/2021 | Katagiri | G02F 1/133504 |

* cited by examiner

LAMINATE AND LIGHT DIFFUSION CONTROL FILM

TECHNICAL FIELD

The present invention relates to a light diffusion control film capable of diffusing or transmitting the incident light depending on the incident angle and relates also to a laminate including the light diffusion control film.

BACKGROUND ART

In recent years, light diffusion control films capable of diffusing or transmitting the incident light depending on the incident angle have been known. The use of such light diffusion control films is studied, for example, for a viewing angle control film that is attached to a window glass, a touch panel of a cash dispenser, or the like to protect privacy, a light control film of a reflective liquid crystal display, etc. The use of the above-described light diffusion control films is also studied for a display body using external light, specifically for a signboard or an indicator. Such a display body using external light is configured, for example, such that characters or images are printed on a surface having light diffusion characteristics or on a specular reflection surface, or a transparent or semi-transparent film on which characters or images are printed is attached to a surface having light diffusion characteristics or to a specular reflection surface.

An example of the light diffusion control film as described above has an internal structure in the film. The internal structure includes a plurality of regions having a relatively high refractive index in a region having a relatively low refractive index. More specifically, an existing light diffusion control film has a louver structure in which a plurality of plate-like regions having different refractive indices is alternately arranged in one arbitrary direction along the film surface. Another existing light diffusion control film has a column structure in which a plurality of columnar bodies having a relatively high refractive index is densely arranged to stand in a region having a relatively low refractive index.

Patent Document 1 discloses a light diffusion control film as described above, which is obtained by curing a resin composition for light diffusion control films. The resin composition contains a predetermined urethane (meth)acrylate compound, a predetermined (meth)acrylic ester compound having an aromatic skeleton, and a predetermined photopolymerization initiator.

PRIOR ART DOCUMENTS

Patent Documents

[Patent Document 1]JP6414883B

SUMMARY OF THE INVENTION

Problems to be Solved by the Invention

The light diffusion control film of Patent Document 1, however, has a problem of liquefaction due to the use over time under a certain condition. In addition, some conventional light diffusion control films turn yellow when stored over time under light shielding conditions.

The present invention has been made in consideration of such actual circumstances, and an object of the present invention is to provide a light diffusion control film and a laminate including the light diffusion control film in which such liquefaction and yellowing are suppressed.

Means for Solving the Problems

To achieve the above object, first, the present invention provides a laminate used under an environment irradiated with external light, the laminate comprising: a light diffusion control film having an internal structure in the film, the internal structure comprising a plurality of regions having a relatively high refractive index in a region having a relatively low refractive index; and an ultraviolet absorbing layer located further on an external light incident side than the light diffusion control film, the light diffusion control film containing a weakly basic hindered amine-based compound having a carbonate skeleton (Invention 1).

In the above invention (Invention 1), the light diffusion control film in the laminate having the above configuration contains a weakly basic hindered amine-based compound having a carbonate skeleton and thereby suppresses the liquefaction and yellowing of the light diffusion control film even when used over time under an external light irradiation environment.

In the above invention (Invention 1), the ultraviolet absorbing layer may preferably have a light transmittance of 30% or less at a wavelength of 380 nm (Invention 2).

In the above invention (Invention 1, 2), the content of the weakly basic hindered amine-based compound having the carbonate skeleton may be preferably 0.01 mass % or more and 10 mass % or less in the light diffusion control film (Invention 3).

In the above invention (Invention 1 to 3), the light diffusion control film may be preferably obtained from a composition that contains a high refractive index component, a low refractive index component having a refractive index lower than that of the high refractive index component, and the weakly basic hindered amine-based compound having the carbonate skeleton (Invention 4).

In the above invention (Invention 1 to 4), the light diffusion control film may preferably contain an ultraviolet absorber (Invention 5).

In the above invention (Invention 1 to 5), the laminate may be a window film (Invention 6).

In the above invention (Invention 6), ultraviolet absorbing layers may be preferably provided on both sides of the light diffusion control film (Invention 7).

In the above invention (Invention 1 to 5), the laminate may be a display body using external light (Invention 8).

Second, the present invention provides a light diffusion control film used in a laminate used under an environment irradiated with external light, the laminate comprising the light diffusion control film and an ultraviolet absorbing layer located further on an external light incident side than the light diffusion control film, the light diffusion control film having an internal structure in the film, the internal structure comprising a plurality of regions having a relatively high refractive index in a region having a relatively low refractive index, the light diffusion control film containing a weakly basic hindered amine-based compound having a carbonate skeleton (Invention 9).

Third, the present invention provides a laminate used under an environment irradiated with external light, the laminate comprising: a light diffusion control film having an internal structure in the film, the internal structure comprising a plurality of regions having a relatively high refractive index in a region having a relatively low refractive index; and an ultraviolet absorbing layer located further on an external light incident side than the light diffusion control film, the light diffusion control film containing a hindered amine-based compound, the laminate having a chromaticity b*0 defined by the CIE 1976 L*a*b* color system of 0.3 or less and a chromaticity b*1 of 0.3 or less after an accelerating test in which the laminate is placed under a dry environment of 40° C. for 28 days.

Advantageous Effect of the Invention

According to the light diffusion control film and laminate of the present invention, liquefaction and yellowing of the light diffusion control film are suppressed.

EMBODIMENTS FOR CARRYING OUT THE INVENTION

Figure 1:
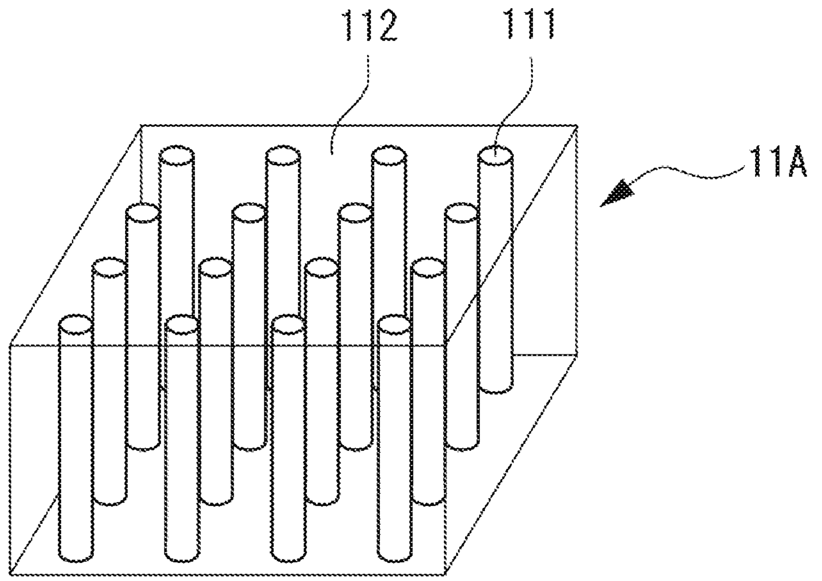
FIG. 1 is a schematic perspective view of an internal structure (column structure) in the light diffusion control film according to an embodiment of the present invention.

Hereinafter, one or more embodiments of the present invention will be described.

<Light Diffusion Control Film>

The light diffusion control film according to an embodiment of the present invention is used in a laminate, which will be described later. The laminate is used under an environment irradiated with external light and includes the light diffusion control film and an ultraviolet absorbing layer located further on the external light incident side than the light diffusion control film. The light diffusion control film according to the present embodiment has an internal structure in the film. The internal structure includes a plurality of regions having a relatively high refractive index in a region having a relatively low refractive index. The light diffusion control film contains a weakly basic hindered amine-based compound having a carbonate skeleton. The above internal structure may be preferably a regular internal structure, which will be described later in detail.

The light diffusion control film according to the present embodiment contains a weakly basic hindered amine-based compound having a carbonate skeleton (this compound may be referred to as a "hindered amine-based compound CL," hereinafter), as described above, and thereby suppresses the liquefaction and yellowing even when used in the above laminate over time under an external light irradiation environment.

The liquefaction and yellowing of the light diffusion control film are mainly caused by the generation of active oxygen or radicals. In particular, the liquefaction of the light diffusion control film occurs such that the generation of active oxygen or radicals breaks the ether bonds of the resin to reduce its molecular weight. In the light diffusion control film according to the present embodiment, the hindered amine skeleton of the hindered amine-based compound CL can trap the active oxygen and radicals, and the carbonate skeleton can suppress the breakage of ether bonds. Furthermore, the hindered amine-based compound CL is weakly basic, so that deactivation by acid does not occur. Due to these actions, the hindered amine-based compound CL can sustainably capture the generated active oxygen and radicals and suppress the liquefaction and yellowing of the light diffusion control film due to the use over time.

Here, the "external light" in the present specification refers to light incident on an object (the laminate herein) from outside the object and includes direct sunlight, skylight, reflected light from a feature, and light from various illuminators or devices as well as light that has passed through a translucent member such as glass or plastic.

The hindered amine refers to an amine that has bulky substituents on both sides of an amino group. As used in the present specification, being "weakly basic" refers to relatively weak or low basicity and is distinguished from ordinary "basicity." Specifically, the relatively weak or low basicity refers to a base dissociation constant (pKb) that is preferably 6 or more, more preferably 8 or more, particularly preferably 10 or more, and further preferably 11 or more in water at 1 atm and 25° C.

The hindered amine-based compound CL in the present embodiment may be preferably a compound that includes at least one skeleton represented by the following general formula (I).

[Chemical Formula 1]

(I)

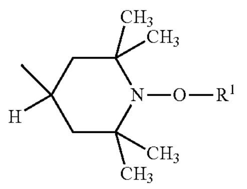

The hindered amine-based compound CL having the above structure is excellent in the effects of suppressing the liquefaction and yellowing of the light diffusion control film. Moreover, the hindered amine-based compound CL in the present embodiment has an $N—O—R^1$ skeleton thereby to well exhibit the weak or low basicity, and the previously described effects are more excellent. It is to be noted that a hindered amine-based compound having an N-alkyl group skeleton, in particular an $N—CH_3$ skeleton, rather than the $N—O—R^1$ skeleton, exhibits basicity.

In the hindered amine-based compound CL in the present embodiment, $R^1$ in the above general formula (I) may be preferably an alkyl group. The carbon number of the alkyl group may be preferably 1 to 30, more preferably 3 to 25, particularly preferably 7 to 18, and further preferably 9 to 13. When $R^1$ is an alkyl group, preferred weak or low basicity is exhibited, and when the carbon number of the alkyl group is within the above range, more preferred weak or low basicity is exhibited.

The hindered amine-based compound CL in the present embodiment may preferably have one or more skeletons represented by the above general formula (I), more preferably have two to ten skeletons, particularly preferably have two to seven skeletons, further preferably have two to four skeletons, and most preferably have two skeletons. The one or more skeletons represented by the above general formula (I) may be present at one or more terminals of the hindered amine-based compound, at one or more side chains, or at one or more terminals and one or more side chains.

When the hindered amine-based compound has two or more skeletons represented by the above general formula (I), each $R^1$ may be the same or may also be different.

The hindered amine-based compound CL in the present embodiment has a carbonate skeleton (—O—C(═O)—O—) at any position, but preferably, a terminal oxygen atom of the carbonate skeleton may be bonded to the 4-position carbon atom in the skeleton represented by the above general formula (I). By having a carbonate skeleton at this position, the hindered amine-based compound CL is more excellent in the effects of suppressing the liquefaction and yellowing of the light diffusion control film.

The hindered amine-based compound CL in the present embodiment may be particularly preferably a compound that is represented by the following structural formula (A).

[Chemical Formula 2]

(A)

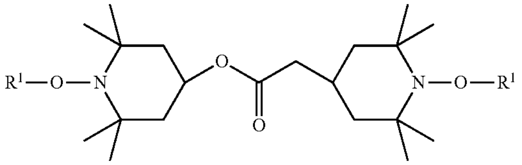

Each $R^1$ in the compound represented by the above structural formula (A) is the same as $R^1$ in the skeleton represented by the above-described general formula (I). Two $R^1$s in the above structural formula (A) may be the same or different, but are preferably the same.

The content of the hindered amine-based compound CL in the light diffusion control film according to the present embodiment may be preferably 0.01 mass % or more, more preferably 0.1 mass % or more, particularly preferably 0.3 mass % or more, further preferably 0.5 mass % or more, and most preferably 0.8 mass % or more. This allows the effects of suppressing the liquefaction and yellowing of the light diffusion control film to be more excellent. From another aspect, the content of the hindered amine-based compound CL may be preferably 10 mass % or less, more preferably 8 mass % or less, particularly preferably 5 mass % or less, further preferably 3 mass % or less, and most preferably 2 mass % or less. This allows the obtained light diffusion control film to have a wide variable haze angle range.

The light diffusion control film according to the present embodiment may be preferably obtained from a composition that contains a high refractive index component, a low refractive index component having a refractive index lower than that of the high refractive index component, and the hindered amine-based compound CL (this composition will be referred to as a "light diffusion control composition D," hereinafter). In particular, the light diffusion control film according to the present embodiment may be preferably obtained by curing the above light diffusion control composition D, and in this case, each of the high refractive index component and the low refractive index component may preferably have one or two polymerizable functional groups. The use of such a light diffusion control composition D allows the regular internal structure, which will be described later, to be readily and satisfactorily formed.

The light diffusion control composition D may preferably contain a component having an ether bond, and the component having an ether bond may be preferably polyether urethane (meth)acrylate. When the light diffusion control film is irradiated with weak ultraviolet rays for a long time, it is considered that the ether bonds in the structural components of the film are broken to readily cause the liquefaction. In the light diffusion control film according to the present embodiment, it is expected that the presence of the hindered amine-based compound CL inhibits the breakage of the above ether bonds and effectively suppresses the occurrence of liquefaction.

The following description will be made for a case in which the light diffusion control composition D contains the high refractive index component, the low refractive index component having a refractive index lower than that of the high refractive index component, and the hindered amine-based compound CL and each of the high refractive index component and the low refractive index component has one or two polymerizable functional groups, but the present invention is not limited to this.

1. Components (1) High Refractive Index Component

Preferred examples of the above high refractive index component include (meth)acrylic ester that contains an aromatic ring, and (meth)acrylic ester that contains a plurality of aromatic rings may be particularly preferred. Examples of the (meth)acrylic ester that contains a plurality of aromatic rings include those in which a part thereof is substituted with halogen, alkyl, alkoxy, alkyl halide, or the like, such as biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth) acrylate, anthracyloxyalkyl (meth)acrylate, and benzylphenyloxyalkyl (meth)acrylate. Among these, biphenyl (meth) acrylate may be preferred from the viewpoint of readily forming a satisfactory regular internal structure. Specifically, o-phenylphenoxyethyl acrylate, o-phenylphenoxyethoxyethyl acrylate, and the like may be preferred. In the present specification, (meth)acrylic acid means both the acrylic acid and the methacrylic acid. The same applies to other similar terms.

The molecular weight (weight-average molecular weight) of the high refractive index component may be preferably 150 to 2,500, particularly preferably 250 to 1,500, and further preferably 250 to 1,000. When the molecular weight (weight-average molecular weight) of the high refractive index component falls within the above range, the light diffusion control film having a desired regular internal structure can be readily formed. When the theoretical molecular weight of the above high refractive index component can be specified based on the molecular structure, the molecular weight (weight-average molecular weight) of the high refractive index component refers to the theoretical molecular weight (molecular weight that may not be the weight-average molecular weight). On the other hand, when it is difficult to specify the above-described theoretical molecular weight, for example, due to the above high refractive index component being a polymer component, the molecular weight (weight-average molecular weight) of the high refractive index component refers to a weight-average molecular weight obtained as a standard polystyrene-equivalent value that is measured using a gel permeation chromatography (GPC) method. As used in the present specification, the weight-average molecular weight refers to a value that is measured as the standard polystyrene equivalent value using the GPC method.

The refractive index of the high refractive index component may be preferably 1.45 to 1.70, more preferably 1.50 to 1.65, particularly preferably 1.54 to 1.60, and further preferably 1.56 to 1.59. When the refractive index of the high refractive index component falls within the above range, the light diffusion control film having a desired regular internal structure and desired light diffusion control ability can be readily formed. As used in the present specification, the refractive index means the refractive index of a certain component before curing the light diffusion control composition D, and the refractive index is measured in accordance with JIS K0062: 1992.

The content of the high refractive index component in the light diffusion control composition D may be preferably 25 to 400 mass parts, particularly preferably 40 to 300 mass parts, and further preferably 50 to 200 mass parts with respect to 100 mass parts of the low refractive index component. When the content of the high refractive index component falls within such ranges, the regions derived from the high refractive index component and the region derived from the low refractive index component exist with a desired ratio in the regular internal structure of the light diffusion control film formed. As a result, the light diffusion control film having a desired regular internal structure can be readily formed.

(2) Low Refractive Index Component

Preferred examples of the above low refractive index component include urethane (meth)acrylate, a (meth) acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may be preferably formed of (a) a compound that contains at least two isocyanate groups, (b) polyalkylene glycol, and (c) hydroxyalkyl (meth)acrylate.

Preferred examples of the above (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 to 19,500, particularly preferably 3,000 to 14,300, and further preferably 4,000 to 12,300.

Preferred examples of the above (c) hydroxyalkyl (meth) acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably set to a ratio of 1-5:1:1-5 and particularly preferably set to a ratio of 1-3:1:1-3.

The weight-average molecular weight of the low refractive index component may be preferably 3,000 to 20,000, particularly preferably 5,000 to 15,000, and further preferably 7,000 to 13,000. When the weight-average molecular weight of the low refractive index component falls within the above range, the light diffusion control film having a desired regular internal structure can be readily formed.

The refractive index of the low refractive index component may be preferably 1.30 to 1.59, more preferably 1.40 to 1.50, particularly preferably 1.44 to 1.49, and further preferably 1.46 to 1.48. When the refractive index of the low refractive index component falls within the above range, the light diffusion control film having a desired regular internal structure and desired light diffusion control ability can be readily formed.

(3) Hindered Amine-Based Compound CL

The previously described ones can be used as the hindered amine-based compound CL. The content of the hindered amine-based compound CL in the light diffusion control composition D may be the same as the content of the hindered amine-based compound CL in the light diffusion control film.

(4) Ultraviolet Absorber

The light diffusion control composition D may preferably further contain an ultraviolet absorber. This allows the light diffusion control film to have more excellent effects of suppressing the liquefaction and yellowing.

Examples of the ultraviolet absorber include benzophenone-based compounds, benzotriazole-based compounds, triazine-based compounds, cyanoacrylates, and salicylic esters, and one type may be used alone or two or more types may be used in combination. Among the above, the benzophenone-based compounds, benzotriazole-based compounds, or triazine-based compounds may be preferred, and the benzotriazole-based compounds may be particularly preferred. These compounds have good compatibility with the previously described high refractive index component and low refractive index component and also have a low degree of coloring.

Preferred examples of the benzophenone-based compounds include 2,2-dihydroxy-4-methoxybenzophenone, 2,4-dihydroxybenzophenone, 2-hydroxy-4-methoxybenzophenone, 2-hydroxy-4-methoxybenzophenone-5-sulfonic acid hydrate, and 2-hydroxy-4-n-octyloxybenzophenone. Preferred examples of the benzotriazole-based compounds include 2-(2-hydroxy-5-t-butylphenyl)-2H-benzotriazole, octyl-3-[3-t-butyl-4-hydroxy-5-(5-chloro-2H-benzotriazole-2-yl]phenyl) propionate, 2-ethylhexyl-3-[3-t-butyl-4-hydroxy-5-(5-chloro-2H-benzotriazole-2-yl]phenyl) propionate, and benzenepropanoic acid-3-(2H-benzotriazole-2-yl)-5-(1,1-dimethylethyl)-4-hydroxy-alkyl ester. Preferred examples of the triazine-based compounds include 2,4-bis [2-hydroxy-4-butoxyphenyl]-6-(2,4-dibutoxyphenyl)-1,3-5-triazine and 2-[4,6-di(2,4-xylyl)-1,3,5-triazine-2-yl]-5-octyloxyphenol. These may each be used alone or two or more types may also be used in combination.

The content of the ultraviolet absorber in the light diffusion control composition D may be preferably 0.001 mass % or more, more preferably 0.01 mass % or more, particularly preferably 0.02 mass % or more, and further preferably 0.06 mass % or more. This allows the light diffusion control film to have more excellent effects of suppressing the liquefaction and yellowing. From another aspect, the content of the ultraviolet absorber may be preferably 5 mass % or less, more preferably 1 mass % or less, particularly preferably 0.5 mass % or less, and further preferably 0.1 mass % or less. This allows the curing of the light diffusion control composition D by ultraviolet irradiation to progress without any problem.

(5) Other Components

The previously described light diffusion control composition D may contain other additives in addition to the high refractive index component, the low refractive index component, and the hindered amine-based compound CL. Examples of the other additives include a polyfunctional monomer (compound having three or more polymerizable functional groups), a photopolymerization initiator, an antioxidant, an antistatic, a polymerization accelerator, a polymerization inhibitor, an infrared absorber, a plasticizer, a diluting solvent, and a leveling agent.

Among the above-described additives, a photopolymerization initiator may be preferably contained in the light diffusion control composition D. When the light diffusion control composition D contains a photopolymerization initiator, the light diffusion control film having a desired regular internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl]propane]. These may each be used alone or two or more types may also be used in combination.

When the photopolymerization initiator is used, the content of the photopolymerization initiator in the light diffusion control composition D may be preferably 0.2 to 20 mass parts, particularly preferably 0.5 to 15 mass parts, and further preferably 1 to 10 mass parts with respect to 100 mass parts of the total amount of the high refractive index component and the low refractive index component. When the content of the photopolymerization initiator in the light diffusion control composition D falls within the above range, the light diffusion control film can be readily and efficiently formed.

2. Preparation of Light Diffusion Control Composition

The light diffusion control composition D can be prepared by uniformly mixing the previously described high refractive index component, low refractive index component, and hindered amine-based compound CL and, if desired, other additives such as a photopolymerization initiator.

In the above mixing, a uniform light diffusion control composition D may be obtained by stirring it while heating it to a temperature of 40° C. to 80° C. A diluting solvent may be added and mixed so that the obtained light diffusion control composition D has a desired viscosity.

3. Internal Structure of Light Diffusion Control Film

The internal structure of the light diffusion control film in the present embodiment includes a plurality of regions having a relatively high refractive index in a region having a relatively low refractive index. This allows the light diffusion control film to diffuse or transmit the incident light depending on the incident angle.

The internal structure of the light diffusion control film in the present embodiment may be preferably a regular internal structure. Specifically, the internal structure may be preferably a regular internal structure in which a plurality of regions having a relatively high refractive index extends with a predetermined length in the film thickness direction in a region having a relatively low refractive index. Such a regular internal structure may have a feature that the regions having a relatively high refractive index extend in the film thickness direction, and this feature is distinguished from those of a phase-separation structure in which one phases exist in the other phase without clear regularity and a sea-island structure in which approximately spherical island components exist in a sea component.

An example of the above regular internal structure may be a column structure in which a plurality of columnar bodies having a relatively high refractive index is densely arranged to stand in a region having a relatively low refractive index. Another example may be a louver structure in which a plurality of plate-like regions having different refractive indices is alternately arranged in one arbitrary direction along the film surface.

(1) Column Structure

FIG. 1 is a perspective view schematically illustrating the above column structure. As illustrated in FIG. 1, the column structure 11A may be a structure in which a plurality of columnar bodies 111 having a relatively high refractive index is densely arranged to stand in the thickness direction and the surroundings thereof are filled with a region 112 having a relatively low refractive index. FIG. 1 depicts the columnar bodies 111 as existing in the entire thickness direction in the column structure 11A, but the columnar bodies 111 may not exist at least in one of the upper end part and lower end part of the column structure 11A in the thickness direction.

When light incident on the light diffusion control film having such a column structure 11A falls within a predetermined incident angle range, the light exits the light diffusion control film while being strongly diffused with a predetermined opening angle. On the other hand, when the incident light falls outside the above incident angle range, the incident light transmits through the light diffusion control film without being diffused or exits the light diffusion control film with weaker diffusion than that in the case of the incident light within the incident angle range. When an image creating body is arranged parallel to the surface of the light diffusion control film, the diffused light caused by the column structure 11A is in a circular shape or an approximately circular shape (such as an elliptical shape) spreading in any direction. On the other hand, in the case of the above weak diffusion due to the incident light outside the above incident angle range, the diffused light is in a crescent shape.

In the column structure 11A, the difference between the refractive index of the columnar bodies 111 having a relatively high refractive index and the refractive index of the region 112 having a relatively low refractive index may be preferably 0.01 to 0.3.

Preferably, the above-described columnar bodies 111 may have a structure in which the diameter increases from one surface of the light diffusion control film to the other surface. The columnar bodies 111 having such a structure may readily change the traveling direction of light parallel to the axial direction of the columnar bodies as compared with columnar bodies in which the diameter does not substantially change from one surface to the other surface. This allows the light diffusion control film to effectively diffuse light.

The maximum value of the diameter in the cross sections when the columnar bodies 111 are cut along a horizontal plane with respect to the axial direction may be preferably 0.1 to 10 μm. The cross-sectional shape of the columnar bodies 111 when cut along a plane perpendicular to the axial direction is not particularly limited, but may be preferably, for example, a circle, an ellipse, a polygonal shape, an irregular shape, or other similar shape.

In the column structure 11A, the distance between adjacent columnar bodies 111 may be preferably 0.1 to 10 μm.

In the column structure 11A, the columnar bodies 111 may be densely arranged to stand parallel to the thickness direction of the light diffusion control film or may also be densely arranged to stand at a certain tilt angle. The tilt angle when the columnar bodies 111 are densely arranged to stand at a certain tilt angle, that is, an angle on the acute angle side formed between the axis of each columnar body 111 of the column structure 11A and the normal line of the surface of the light diffusion control film, may be preferably 1° to 50°.

The dimensions, predetermined angle, and other parameters relating to the regular internal structure of the column structure 11A described above can be measured by observing the cross section of the column structure 11A using an optical digital microscope.

(2) Louver Structure

Figure 2:
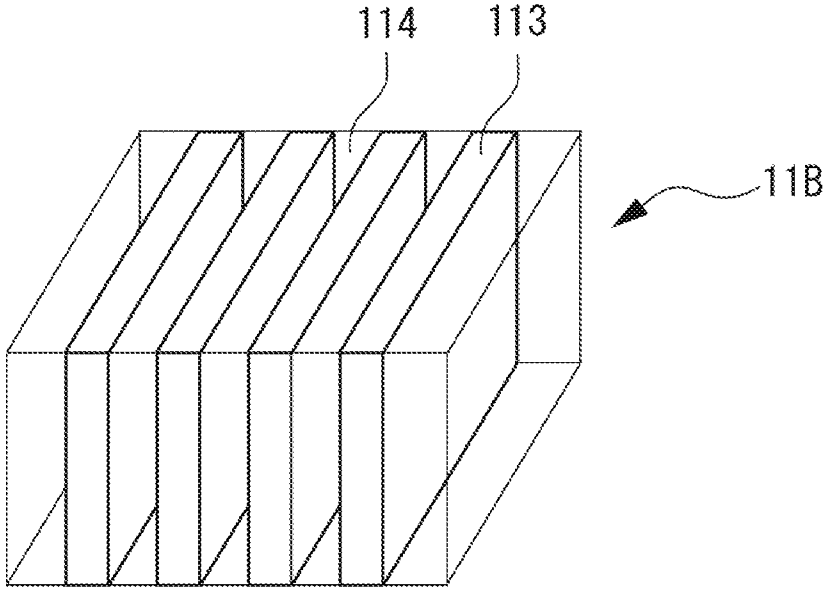
FIG. 2 is a schematic perspective view of an internal structure (louver structure) in the light diffusion control film according to another embodiment of the present invention.

FIG. 2 is a perspective view schematically illustrating the above louver structure. As illustrated in FIG. 2, the louver structure 11B may be a structure in which plate-like regions 113 having a relatively high refractive index are alternately arranged in one direction along the film surface and spaces therebetween are filled with regions 114 having a relatively low refractive index. FIG. 2 depicts the plate-like regions 113 as existing in the entire thickness direction in the louver structure 11B, but the plate-like regions 113 may not exist at least in one of the upper end part and lower end part of the louver structure 11B in the thickness direction.

Light incident on the light diffusion control film having such a louver structure 11B exits the light diffusion control film while being diffused or transmits through the light diffusion control film without being diffused, depending on the incident angle. The light diffusion control film having the louver structure 11B has a property that the diffusion is likely to occur in a direction perpendicular to the arrangement direction of the plate-like regions 113.

In the louver structure 11B, the difference between the refractive index of the plate-like regions 113 having a relatively high refractive index and the refractive index of the regions 114 having a relatively low refractive index may be preferably 0.01 to 0.3.

In the louver structure 11B, the thickness (width in the arrangement direction) of each plate-like region 113 may be preferably 0.1 to 10 μm.

In the louver structure 11B, the plate-like regions 113 may be tilted along the arrangement direction or may also be arranged to coincide with the film normal direction without any tilt. The tilt angle when tilted along the arrangement direction, that is, an angle on the acute angle side formed between one surface of each plate-like region 113 and the normal line of the light diffusion control film, may be preferably 1° to 60°.

The dimensions, predetermined angle, and other parameters relating to the internal structure of the louver structure 11B described above can be measured by observing the cross section of the louver structure 11B using an optical digital microscope.

(3) Other Internal Structures

The internal structure of the light diffusion control film according to the present embodiment may be a structure other than the above-described column structure 11A and louver structure 11B. For example, the light diffusion control film may have, as the internal structure, a structure in which the columnar bodies 111 in the above-described column structure 11A are bent at the middle in the thickness direction of the light diffusion control film. Moreover, the light diffusion control film may have, as the internal structure, a structure in which the plate-like regions 113 in the above-described louver structure 11B are bent at the middle in the thickness direction of the light diffusion control film. Furthermore, the internal structure of the light diffusion control film according to the present embodiment may be a structure in which the regions of the columnar bodies 111 or the plate-like regions 113 are each provided as two or more portions so as to have different tilt angles, different bending angles, or difference in the presence or absence of bending. Alternatively, the light diffusion control film according to the present embodiment may have an internal structure in which two or more of the column structure 11A, the louver structure 11B, and the above-described bent structure are arbitrarily combined and laminated.

(4) Ratio of Internal Structure in Thickness Direction of Light Diffusion Control Film As described previously, the light diffusion control film according to the present embodiment may preferably have an internal structure in which a plurality of regions having a relatively high refractive index is provided to extend in the thickness direction in a region of the film having a relatively low refractive index. Here, the ratio of the internal structure extending in the thickness direction may be preferably 10% or more, more preferably 30% or more, and particularly preferably 50% or more from the viewpoint of making the light diffusivity more efficient. The upper limit of the ratio is not limited and may be 100%, that is, the internal structure may be formed in the whole length in the thickness direction.

4. Physical Properties and Other Properties of Light Diffusion Control Film (1) Thickness The thickness of the light diffusion control film according to the present embodiment may be preferably 20 to 700 μm, particularly preferably 40 to 400 μm, and further preferably 60 to 200 μm. When the lower limit of the thickness of the light diffusion control film is as above, the light diffusion control film may readily exhibit desired light diffusion control ability. When the upper limit of the thickness of the light diffusion control film is as above, the occurrence of dents and/or collapse can be readily suppressed.

(2) Variable Haze Angle Range

When the internal structure in the light diffusion control film is the previously described column structure 11A or its modified structure, the angle range (variable haze angle range) of an incident angle that gives a haze value equal to or more than a threshold may be preferably 5° to 100°. The threshold is set to 90% of the maximum haze value measured when one surface of the diffusion film is irradiated with light rays at an incident angle of −70° to 70° with respect to the normal direction of the surface being 0°.

When the internal structure in the light diffusion control film is the previously described louver structure 11B or its modified structure, the angle range (variable haze angle range) of an incident angle that gives a haze value equal to or more than a threshold may be preferably 30° or more, more preferably 40° or more, particularly preferably 50° or more, and further preferably 60° or more. The threshold is set to 90% of the maximum haze value measured when one surface of the diffusion film is irradiated with light rays at an incident angle of −70° to 70° with respect to the normal direction of the surface being 0°. When the above variable haze angle range is 30° or more, the angle range of incident light that can achieve satisfactory light diffusion control ability is wider. The upper limit of the above variable haze angle range is not particularly limited and may be, for example, 120° or less in an embodiment, 110° or less in a particular embodiment, and 100° or less in a further embodiment.

Details of a method of measuring the above variable haze angle range are as described in the testing example, which will be described later.

5. Method of Manufacturing Light Diffusion Control Film

The method of manufacturing the light diffusion control film according to the present embodiment is not particularly limited, and the light diffusion control film can be manufactured using a conventionally known method. For example, one surface of a process sheet may be coated with a composition for light diffusion control films, preferably the previously described light diffusion control composition D, to form a coating film. The light diffusion control film can be formed by irradiating the above coating film with active energy rays to cure the coating film. Before or after the above irradiation with active energy rays, one surface (in particular, release surface) of a release sheet may be attached to the surface of the above coating film opposite to the process sheet, and the above coating film may be cured by irradiating the coating film with active energy rays through the process sheet or the release sheet.

Examples of the method for the above coating include a knife coating method, a roll coating method, a bar coating method, a blade coating method, a die coating method, and a gravure coating method. The light diffusion control composition D may be diluted using a solvent as necessary.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

Irradiation of the coating film with the active energy rays may be performed in a different mode depending on the internal structure to be formed. For example, when forming the previously described column structure 11A, the coating film may be irradiated with parallel light having a high degree of parallelism of light rays. Here, the parallel light means approximately parallel light that does not spread when the direction of emitted light is viewed from any direction. Such parallel light can be prepared using a known means such as a lens or a light shielding member. During the irradiation, it is preferred to irradiate the laminate of the coating film and the process sheet with the above parallel light while moving the laminate in the longitudinal direction using a conveyor or the like. The tilt angle of the columnar bodies 111 formed in the column structure 11A can be adjusted by adjusting the irradiation angle of the above parallel light.

When forming the column structure 11A using ultraviolet rays as the active energy rays, it may be preferred to set the irradiation condition such that the peak illuminance on the coating film surface is 0.1 to 10 $mW/cm^2$. The peak illuminance as referred to herein means a measured value at a portion at which the active energy rays irradiating the coating film surface show the maximum value. Additionally or alternatively, it may be preferred to set the integrated light amount on the coating film surface to 5 to 200 $mJ/cm^2$.

When forming the column structure 11A using ultraviolet rays as the active energy rays, the relative moving speed of the light source for the active energy rays with respect to the above laminate may be preferably 0.1 to 10 m/min.

On the other hand, when forming the previously described louver structure 11B, a linear light source may be used as the light source for the active energy rays to irradiate the laminate surface with light randomly in the width direction (TD direction) and with approximately parallel strip-shaped (substantially linear) light in the flow direction (MD direction). The tilt angle of the plate-like regions 113 formed in the louver structure 11B can be adjusted by adjusting the irradiation of the above light.

When forming the louver structure 11B using ultraviolet rays as the active energy rays, the irradiation condition may be preferably set such that the peak illuminance on the coating film surface is 0.1 to 50 $mW/cm^2$. Additionally or alternatively, it may be preferred to set the integrated light amount on the coating film surface to 5 to 300 $mJ/cm^2$. Additionally or alternatively, the relative moving speed of the light source for the active energy rays with respect to the above laminate may be preferably set to 0.1 to 10 m/min.

From the viewpoint of completing more reliable curing, it may also be preferred to perform irradiation with commonly-used active energy rays (active energy rays for which the process of converting the rays into parallel light or strip-shaped light is not performed, scattered light) after performing the curing using the parallel light or the strip-shaped light as previously described. For this operation, a release sheet may be laminated on the coating film surface from the viewpoint of uniform curing.

<Laminate>

The laminate according to an embodiment of the present invention is a laminate used under an environment irradiated with external light. The laminate includes a light diffusion control film having an internal structure in the film. The internal structure includes a plurality of regions having a relatively high refractive index in a region having a relatively low refractive index. The laminate further includes an ultraviolet absorbing layer located further on the external light incident side than the light diffusion control film. The above light diffusion control film contains the hindered amine-based compound CL.

In the laminate having the above configuration, even when it is used over time under an external light irradiation environment, the liquefaction and yellowing of the light diffusion control film are suppressed.

The light diffusion control film in the laminate according to the present embodiment is the light diffusion control film according to the previously described embodiment.

The light transmittance of the ultraviolet absorbing layer at a wavelength of 380 nm may be preferably 30% or less, more preferably 10% or less, particularly preferably 1% or less, further preferably 0.1% or less, and most preferably 0.05% or less. On the other hand, the lower limit of the light transmittance is not particularly limited and may be preferably 0%. From the viewpoint of balancing with high transmittance in the visible light region, the lower limit of the light transmittance may be preferably 0.001% or more, more preferably 0.005% or more, particularly preferably 0.010% or more, and further preferably 0.015% or more. When the light transmittance of the ultraviolet absorbing layer at a wavelength of 380 nm falls within the above range, the conventional light diffusion control film tends to be liquefied over time under an external light irradiation environment. This appears to be because the light diffusion control film is irradiated with weak ultraviolet rays for a long time to break some molecular chains in the light diffusion control film. On the other hand, according to the present embodiment, when the light transmittance of the ultraviolet absorbing layer at a wavelength of 380 nm falls within the above range, the yellowing of the light diffusion control film can be suppressed more effectively, and other member or members of the laminate can be protected from ultraviolet rays.

The ultraviolet absorbing layer in the present embodiment may preferably have high transmissivity for light rays in the visible light region. From this viewpoint, the light transmittance of the ultraviolet absorbing layer at a wavelength of 480 nm may be preferably 60% or more, particularly preferably 80% or more, and further preferably 86% or more. From the same viewpoint, the light transmittance of the ultraviolet absorbing layer at a wavelength of 580 nm may be preferably 60% or more, particularly preferably 80% or more, and further preferably 86% or more. On the other hand, the upper limit of the light transmittance at a wavelength of 480 nm and the upper limit of the light transmittance at a wavelength of 580 nm of the ultraviolet absorbing layer are not particularly limited and may be preferably 100%. From the viewpoint of balancing with low transmittance in the ultraviolet light region, the above upper limits may be preferably 99% or less and particularly preferably 98% or less.

The ultraviolet absorbing layer may be a pressure sensitive adhesive layer that contains an ultraviolet absorber or may also be a plastic film that contains an ultraviolet absorber. Alternatively, the ultraviolet absorbing layer may be a combination of such layers or films or a combination with another layer that does not contain an ultraviolet absorber.

When the ultraviolet absorbing layer is a pressure sensitive adhesive layer that contains an ultraviolet absorber, the type of a pressure sensitive adhesive that constitutes the pressure sensitive adhesive layer is not particularly limited, and conventionally known ones can be used. Examples of the pressure sensitive adhesive for use include an acrylic-based pressure sensitive adhesive, a silicone-based pressure sensitive adhesive, a urethane-based pressure sensitive adhesive, and a rubber-based pressure sensitive adhesive, among which the acrylic-based pressure sensitive adhesive may be preferred because it can readily achieve satisfactory pressure sensitive adhesive property and transparency. The type of plastic is also not particularly limited when used for the plastic film that contains an ultraviolet absorber, and conventionally known ones can be used.

The ultraviolet absorber of the ultraviolet absorbing layer is not particularly limited, and the same ultraviolet absorber that can be contained in the previously described light diffusion control composition D can be used.

The laminate according to the present embodiment can be used for various purposes in which the control of light diffusion is required under an external light irradiation environment. Examples of the laminate include a viewing angle control film that is attached to a window glass, a display of a cash dispenser, a monitor of a personal computer, a display of a smartphone, or the like to protect privacy; a light control film used for a reflective liquid crystal display or the like; and a display body using external light, such as a signboard or an indicator. The laminate can be suitably used for, among the above, a window film attached to a window glass or the like for the purpose of controlling the viewing angle, a display body using external light, or the like.

When the laminate according to the present embodiment is used as a window film to be attached to a window glass, it is also preferred to provide the ultraviolet absorbing layers on both sides of the light diffusion control film. This allows both the ultraviolet rays of sunlight and the ultraviolet rays from an interior lamp to be absorbed, and it is possible to effectively suppress the yellowing of the light diffusion control film and protect a desired member from the ultraviolet rays. Even with the above configuration, the conventional light diffusion control film may be liquefied over time.

Chromaticity b*0 defined by the CIE1976 L*a*b* color system of the laminate according to the present embodiment may be preferably 0.3 or less, more preferably 0.2 or less, particularly preferably 0.1 or less, further preferably 0 or less, and most preferably −0.3 or less. From another aspect, the lower limit of the chromaticity b*0 may be preferably −10 or more, more preferably −5 or more, particularly preferably −1 or more, and further preferably −0.5 or more. When the chromaticity b*0 of the laminate falls within the above range, it can be said that the laminate has a small yellowness index and is excellent in colorless transparency.

After an accelerating test in which the laminate according to the present embodiment is placed under a dry environment of 40° C. for 28 days, chromaticity b*1 defined by the CIE1976 L*a*b* color system of the laminate may be preferably 0.3 or less, more preferably 0.2 or less, particularly preferably 0.1 or less, further preferably 0 or less, and most preferably −0.4 or less. From another aspect, the lower limit of the absolute value of the chromaticity b*1 may be preferably −10 or more, more preferably −5 or more, particularly preferably −1 or more, and further preferably −0.6 or more. When the upper limit of the chromaticity b*0 of the laminate is as above, it can be said that the laminate has a small yellowness index even over time and is excellent in colorless transparency.

The light transmittance of the laminate according to the present embodiment at a wavelength of 380 nm may be preferably 30% or less, more preferably 10% or less, particularly preferably 1% or less, further preferably 0.1% or less, and most preferably 0.05% or less. On the other hand, the lower limit of the light transmittance is not particularly limited and may be preferably 0%. From the viewpoint of balancing with high transmittance in the visible light region, the lower limit of the light transmittance may be preferably 0.001% or more, more preferably 0.005% or more, particularly preferably 0.010% or more, and further preferably 0.015% or more. When the light transmittance at a wavelength of 380 nm falls within the above range, the yellowing of the light diffusion control film and thus of the laminate can be suppressed more effectively, and the laminate can be protected from ultraviolet rays.

The laminate according to the present embodiment may preferably have high transmissivity for light rays in the visible light region. From this viewpoint, the light transmittance of the ultraviolet absorbing layer at a wavelength of 480 nm may be preferably 60% or more, particularly preferably 80% or more, and further preferably 86% or more. From the same viewpoint, the light transmittance of the ultraviolet absorbing layer at a wavelength of 580 nm may be preferably 60% or more, particularly preferably 80% or more, and further preferably 86% or more. On the other hand, the upper limit of the light transmittance at a wavelength of 480 nm and the upper limit of the light transmittance at a wavelength of 580 nm of the ultraviolet absorbing layer are not particularly limited and may be preferably 100%. From the viewpoint of balancing with low transmittance in the ultraviolet light region, the above upper limits may be preferably 99% or less and particularly preferably 98% or less.

Specific examples of the laminate according to the present embodiment will be described below by exemplifying a window film as a viewing angle control film and a display body using external light (e.g., a station name board, or a running in board), but the laminate according to the present invention is not limited thereto.

1. Window Film

Figure 3:
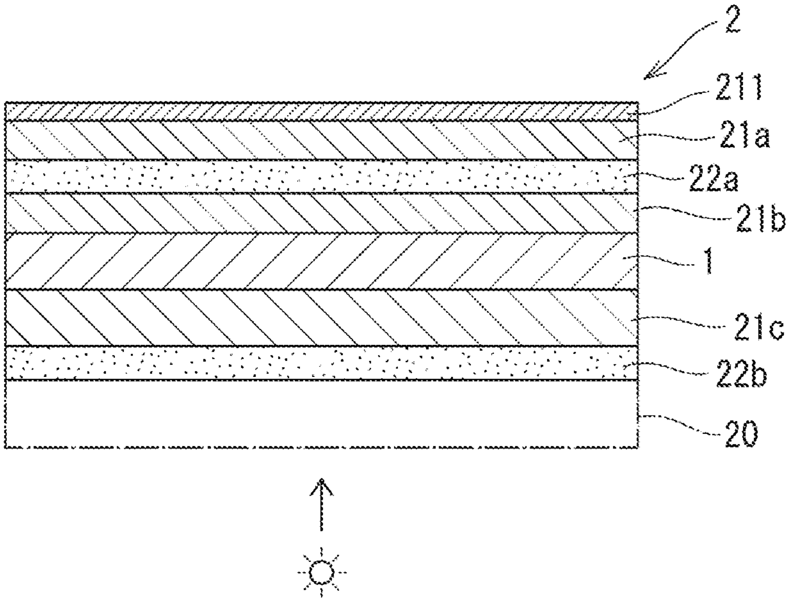
FIG. 3 is a cross-sectional view of the laminate (window film) according to an embodiment of the present invention.

FIG. 3 illustrates a window film as an example of the laminate according to the present embodiment. As illustrated in FIG. 3, the window film 2 in the present embodiment is configured to include a transparent resin film 21*a* with a hard coat layer 211, a pressure sensitive adhesive layer 22*a* containing an ultraviolet absorber, a transparent resin film 21*b*, a light diffusion control film 1, a transparent resin film 21*c*, and a pressure sensitive adhesive layer 22*b* containing an ultraviolet absorber in this order from the top of the figure.

The window film 2 in the present embodiment may be attached to a window glass 20 or the like via the pressure sensitive adhesive layer 22*b* containing an ultraviolet absorber. In the present embodiment, the window film 2 may be attached to the inside of the window glass 20, and sunlight is therefore incident on the window film 2 through the window glass 20. Alternatively, the window film 2 may be attached to the outside of the window glass 20.

The light diffusion control film 1 is the light diffusion control film 1 according to the previously described embodiment. In the window film 2 in the present embodiment, the internal structure of the light diffusion control film 1 may be preferably the louver structure 11B or its modified structure, but is not limited thereto.

In the window film 2 in the present embodiment, the pressure sensitive adhesive layer 22*a* containing an ultraviolet absorber and the pressure sensitive adhesive layer 22*b* containing an ultraviolet absorber each correspond to the ultraviolet absorbing layer. That is, in the present embodiment, the ultraviolet absorbing layers exist on both sides of the light diffusion control film 1.

The thicknesses of the pressure sensitive adhesive layers 22*a* and 22*b* containing an ultraviolet absorber are not particularly limited, provided that the layers exhibit the desired adhesive strength and satisfy the previously described light transmittance at a wavelength of 380 nm. In general, the thicknesses may be preferably 1 to 100 μm, particularly preferably 5 to 50 μm, and further preferably 10 to 30 μm.

The materials of the transparent resin films 21*a*, 21*b*, and 21*c* can be appropriately selected from known transparent resin films, and may be the same material or may also be different materials. Examples of the transparent resin films include films made of polyester-based resins such as polyethylene terephthalate and polyethylene naphthalate; polyolefin-based resins such as polyethylene, polypropylene, poly(4-methyl-1-pentene), and poly-1-butene; polycarbonate-based resins; polyvinyl chloride-based resins; polyether sulfone-based resins; polyethylene sulfide-based resins; styrene-based resins; acrylic-based resins; polyamide-based resins; and cellulose-based resins such as cellulose acetate, or a laminated film thereof, among which polyester films may be preferred and polyethylene terephthalate films may be particularly preferred.

Any one or two or more of the transparent resin films 21*a*, 21*b*, and 21*c* may contain an ultraviolet absorber. In this case, the transparent resin film or films and the above pressure sensitive adhesive layers 22*a* and 22*b* containing an ultraviolet absorber each serve as the ultraviolet absorbing layer in the present embodiment.

The hard coat layer 211 can be formed of a known material, and its thickness is not particularly limited and can be a general thickness.

The window film 2 in the present embodiment can be manufactured by a conventionally known method, and the method is not particularly limited.

When the window film 2 in the present embodiment is attached to a window glass, the viewing angle can be controlled such that, for example, the other side of the window film 2 can be seen when viewed from a predetermined angle while the other side of the window film 2 cannot be seen when viewed from another angle.

2. Display Body Using External Light

Figure 4:
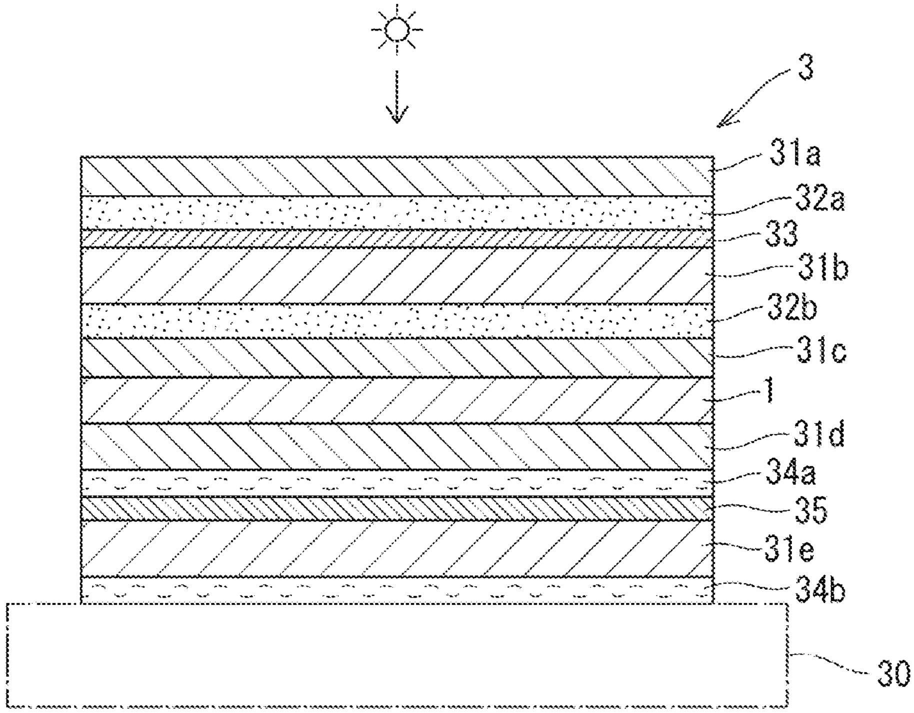
FIG. 4 is a cross-sectional view of the laminate (display body using external light) according to another embodiment of the present invention.

FIG. 4 illustrates a display body using external light (e.g., a station name board, or a running in board) as an example of the laminate according to the present embodiment. As illustrated in FIG. 4, the display body using external light 3 in the present embodiment is configured to include a transparent resin film 31*a*, a pressure sensitive adhesive layer 32*a* containing an ultraviolet absorber, a decorative layer 33, a transparent resin film 31*b*, a pressure sensitive adhesive layer 32*b* containing an ultraviolet absorber, a transparent resin film 31*c*, a light diffusion control film 1, a transparent resin film 31*d*, a pressure sensitive adhesive layer 34*a*, a reflective layer 35, a transparent resin film 31*e*, and a pressure sensitive adhesive layer 34*b* in this order from the top of the figure. The transparent resin film 31*c* and/or the transparent resin film 31*d* may be omitted.

The display body using external light 3 in the present embodiment may be attached to a base material (frame member) 30 or the like via the pressure sensitive adhesive layer 34*b*. In the present embodiment, sunlight is incident on the display body using external light 3 from above in the figure, that is, from the transparent resin film 31*a* side.

The light diffusion control film 1 is the light diffusion control film 1 according to the previously described embodiment. In the display body using external light 3 in the present embodiment, the internal structure of the light diffusion control film 1 may be preferably the column structure 11A or its modified structure (such as a two-layer structure of a bent column structure having columnar bodies bent at the middle and a column structure having linear columnar bodies), but is not limited thereto.

In the display body using external light 3 in the present embodiment, the pressure sensitive adhesive layer 32*a* containing an ultraviolet absorber and the pressure sensitive adhesive layer 32*b* containing an ultraviolet absorber each correspond to the ultraviolet absorbing layer. In the present embodiment, therefore, at least two ultraviolet absorbing layers are present further on the external light incident side than the light diffusion control film 1.

The thicknesses of the pressure sensitive adhesive layers 32*a* and 32*b* containing an ultraviolet absorber are not particularly limited, provided that the layers exhibit the desired adhesive strength and satisfy the previously described light transmittance at a wavelength of 380 nm. In general, the thicknesses may each be preferably 1 to 100 μm, more preferably 5 to 50 μm, particularly preferably 10 to 40 μm, and further preferably 15 to 30 μm.

The materials of the transparent resin films 31*a*, 31*b*, 31*c*, 31*d*, and 31*e* can be appropriately selected from known transparent resin films, and may be the same material or may also be different materials. Examples of the transparent resin films include films made of polyester-based resins such as polyethylene terephthalate and polyethylene naphthalate; polyolefin-based resins such as polyethylene, polypropylene, poly(4-methyl-1-pentene), and poly-1-butene; polycarbonate-based resins; polyvinyl chloride-based resins; polyether sulfone-based resins; polyethylene sulfide-based resins; styrene-based resins; acrylic-based resins; polyamide-based resins; cellulose-based resins such as cellulose acetate; and fluorine-based resins, or a laminated film thereof.

The transparent resin film 31*a* may be preferably a fluorine-based resin film among the above because of the excellent light resistance. The surface of the transparent resin film 31*a* on the external light side may be glossy or may also be matte. The transparent resin films 31*b* and 31*e* may be preferably polyvinyl chloride films or polyethylene terephthalate films. The transparent resin films 31*c* and 31*d* may be preferably polyester films and particularly preferably polyethylene terephthalate films.

Any one or two or more of the transparent resin films 31*a*, 31*b*, 31*c*, and 31*d* may contain an ultraviolet absorber. In particular, the transparent resin films 31*a* and 31*b* may preferably contain an ultraviolet absorber. In this case, the transparent resin films and the above pressure sensitive adhesive layers 32*a* and 32*b* containing an ultraviolet absorber each serve as the ultraviolet absorbing layer in the present embodiment.

The thicknesses of the transparent resin films 31*a* and 31*b* containing an ultraviolet absorber may be preferably 10 to 1,000 μm, particularly preferably 50 to 500 μm, and further preferably 80 to 200 μm from the viewpoint of achieving both the ultraviolet absorbability and the visible light transmissivity.

The decorative layer 33 is not particularly limited, provided that it can present the display content by characters, patterns, or the like and does not interfere with the desired light diffusion effect, and conventionally known ones can be used. For example, the decorative layer 33 may be printed with ink constituting characters, patterns, or the like on the surface of the transparent resin film 31*b*.

The thickness of the decorative layer 33 is not particularly limited, but may be preferably 10 to 1,000 μm and particularly preferably 20 to 500 μm, for example.

The type of the pressure sensitive adhesive constituting the pressure sensitive adhesive layers 34*a* and 34*b* is not particularly limited, and conventionally known ones can be used. Examples of the pressure sensitive adhesive for use include an acrylic-based pressure sensitive adhesive, a silicone-based pressure sensitive adhesive, a urethane-based pressure sensitive adhesive, and a rubber-based pressure sensitive adhesive, among which the acrylic-based pressure sensitive adhesive may be preferred because it can readily achieve satisfactory pressure sensitive adhesive property and transparency.

The thicknesses of the pressure sensitive adhesive layers 34*a* and 34*b* are not particularly limited, provided that sufficient pressure sensitive adhesive property can be achieved, and may be preferably 1 to 100 μm and particularly preferably 3 to 30 μm, for example.

The reflective layer 35 may be a reflective layer having a smooth surface (specular reflective layer) or a reflective layer having retroreflective ability. In the case of a specular reflection layer, it can be formed as a metal vapor deposition layer, for example, by performing vapor deposition or the like of a metal on the surface of the transparent resin film 31*e*. Examples of the metal vapor deposition layer include an aluminum vapor deposition layer, a silver vapor deposition layer, a stainless steel vapor deposition layer, and a copper vapor deposition layer. The thickness of the reflective layer 35 in this case can be a general thickness as that for a metal vapor deposition layer.

In the case of a reflective layer having retroreflective ability, examples thereof for use include those in which a considerable number of corner cubes are arranged on the reflective surface (corner cube type, prism lens type), those having a structure in which a considerable number of glass beads are arranged on the reflective surface and covered with a transparent resin film via a certain space above the glass beads (capsule lens type), those having a structure in which a considerable number of glass beads are encapsulated in a transparent resin sheet (encapsulated lens type), and those in which a considerable number of glass beads are arranged so as to be exposed on the reflective surface (exposed lens type). The thickness of the reflective layer 35 in this case is not particularly limited, and may be 0.01 to 1 mm and particularly 0.1 to 0.5 mm, for example.

The display body using external light 3 in the present embodiment can be manufactured by a conventionally known method, and the method is not particularly limited.

When the display body using external light 3 in the present embodiment is used, for example, as a built-in type station name board (station name board installed on the platform at a height equivalent to the line of sight of a person), even in a station where no illuminators are provided around the station, passengers of a train can visually recognize the built-in type station name board using the light from the train, especially the light leaking from the doors, at night.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

In the present specification, unless otherwise specified, the statement of "X to Y" (X and Y are arbitrary numbers) encompasses not only the meaning of "X or more and Y or less" but also the meaning of "preferably more than X" or "preferably less than Y." In addition, unless otherwise specified, the statement of "X or more" (X is an arbitrary number) encompasses the meaning of "preferably more than X," and the statement of "Y or less" (Y is an arbitrary number) encompasses the meaning of "preferably less than Y."

EXAMPLES

Hereinafter, the present invention will be described further specifically with reference to examples etc., but the scope of the present invention is not limited to these examples etc.

Example 1

1. Preparation of Light Diffusion Control Composition

Polypropylene glycol, isophorone diisocyanate, and 2-hydroxyethyl methacrylate were reacted to obtain polyether urethane methacrylate having a weight-average molecular weight of 9,900. After compounding 60 mass parts of o-phenylphenoxyethoxyethyl acrylate, 40 mass parts of the above polyether urethane methacrylate, 8 mass parts of 2-hydroxy-2-methyl-1-phenylpropan-1-one as the photopolymerization initiator, 1.0 mass parts of a weakly basic hindered amine-based compound represented by the following structural formula (B) and having a carbonate skeleton (hindered amine-based compound CL, base dissociation constant pKb: 11.3), and 0.08 mass parts of a benzophenone-based compound (available from BASF, product name "Tinuvin 384-2") as the ultraviolet absorber, the compounded materials were heated and mixed under a condition of 80° C. to obtain a light diffusion control composition.

[Chemical Formula 3]

(B)

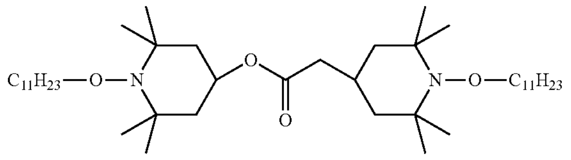

Here, the previously described weight-average molecular weight (Mw) refers to a weight-average molecular weight that is measured as a standard polystyrene equivalent value under the following condition using gel permeation chromatography (GPC) (GPC measurement).

<Measurement Condition>

Measurement apparatus: HLC-8320 available from Tosoh Corporation

GPC columns (passing through in the following order): available from Tosoh Corporation TSK gel super H-H TSK gel super HM-H TSK gel super H2000

Solvent for measurement: tetrahydrofuran

Measurement temperature: 40° C.

2. Formation of Light Diffusion Control Film

One surface of a long polyethylene terephthalate film (thickness of 50 μm; first PET film) as the process sheet was coated with the obtained light diffusion control composition to form a coating film. A laminate composed of the coating film and the process sheet was thus obtained.

The above laminate was then irradiated with parallel light of ultraviolet rays having a parallelism of 2° or less using an ultraviolet spot parallel light source (available from JATEC) having a controlled center beam parallelism within ±3°. In this operation, when viewed from the longitudinal direction of the parallel light source, the irradiation angle of the ultraviolet rays emitted from a high-pressure mercury lamp to the laminate was adjusted to be 10° with reference to the normal line to the surface of the laminate, and the irradiation was performed under the conditions of a peak illuminance of 1.18 mW/cm$^2$, an integrated light amount of 24.1 mJ/cm$^2$, a lamp height of 240 mm, and a moving speed of the laminate of 0.2 m/min.

After the above first ultraviolet irradiation step, the exposed side of the coating film was laminated with a long polyethylene terephthalate film (thickness of 50 μm; second PET film) to create a state under a non-oxygen atmosphere. Then, in the same manner as in the first ultraviolet irradiation step, the coating film was irradiated with parallel light of ultraviolet rays having a parallelism of 2° or less through the second PET film from the same side as that in the first ultraviolet irradiation step so that when viewed from the longitudinal direction of the parallel light source, the irradiation angle of the ultraviolet rays emitted from the high-pressure mercury lamp to the laminate would be approximately 0° with reference to the normal line to the surface of the laminate. The irradiation was performed under the conditions of a peak illuminance of 1.26 mW/cm$^2$, an integrated light amount of 22.4 mJ/cm$^2$, a lamp height of 240 mm, and a moving speed of the laminate of 0.2 m/min. The above peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the coating film.

Through the above primary curing and secondary curing, a light diffusion control film having a thickness of 200 μm was formed so that the above-described coating film was cured. Thus, a laminate was obtained in which the second PET film having a thickness of 38 μm, the light diffusion control film having a thickness of 200 μm, and the first PET film (process sheet) having a thickness of 50 μm were laminated in this order. The thickness of the light diffusion control film was measured using a constant-pressure thickness meter (available from Takara Seisakusho, product name "Teclock PG-02J").

When microscopic observation and the like of the cross section of the formed light diffusion control film were performed, it was confirmed that a column structure was formed in which a plurality of columnar regions was alternately arranged in one direction along the film surface. The column structure was configured to bend at the middle in the thickness direction of the light diffusion control film.

3. Production of Display Body Using Pseudo-External Light

An acrylic-based pressure sensitive adhesive layer (without an ultraviolet absorber, thickness of 25 μm) was laminated on the first PET film side of the laminate (second PET film/light diffusion control film/first PET film) including the light diffusion control film manufactured as above.

Then, an acrylic-based pressure sensitive adhesive layer (thickness of 20 μm) containing an ultraviolet absorber was laminated on one surface of a first polyvinyl chloride resin (PVC) film (containing an ultraviolet absorber, thickness of 80 μm).

In addition, an aluminum layer (nano-order thickness) was vapor-deposited as the reflective layer on one surface of a second PVC film (without an ultraviolet absorber, thickness of 50 μm). Then, an acrylic-based pressure sensitive adhesive layer (without an ultraviolet absorber, thickness of 25 μm) was laminated on the surface of the PVC film opposite to the reflective layer.

Furthermore, an acrylic-based pressure sensitive adhesive layer (thickness of 20 μm) containing an ultraviolet absorber was laminated on one surface of a fluorine-based resin film (containing an ultraviolet absorber, thickness of 100 μm).

The above components were laminated to obtain a laminate as a display body using pseudo-external light composed of the fluorine-based resin film, the acrylic-based pressure sensitive adhesive layer containing an ultraviolet absorber, the first PVC film, the acrylic-based pressure sensitive adhesive layer containing an ultraviolet absorber, the second PET film, the light diffusion control film, the first PET film, the acrylic-based pressure sensitive adhesive layer, the reflective layer, the second PVC film, and the acrylic-based pressure sensitive adhesive layer in this order from the top (see FIG. 4, but without a decorative layer).

Example 2

The light diffusion control composition was prepared in the same manner as in Example 1 except that the compounding amount of the hindered amine-based compound CL represented by the above structural formula (B) was 1.5 mass parts. A laminate including the light diffusion control film and a laminate as the display body using pseudo-external light were manufactured in the same manner as in Example 1 using the light diffusion control composition.

Example 3

The light diffusion control composition was prepared in the same manner as in Example 1 except that the compounding amount of the hindered amine-based compound CL represented by the above structural formula (B) was 2.0 mass parts. A laminate including the light diffusion control film and a laminate as the display body using pseudo-external light were manufactured in the same manner as in Example 1 using the light diffusion control composition.

Comparative Example 1

The light diffusion control composition was prepared in the same manner as in Example 1 except that the hindered amine-based compound CL represented by the above structural formula (B) was not compounded. A laminate including the light diffusion control film and a laminate as the display body using pseudo-external light were manufactured in the same manner as in Example 1 using the light diffusion control composition.

Comparative Example 2

The light diffusion control composition was prepared in the same manner as in Example 1 except that 0.5 mass parts of a basic hindered amine-based compound having no carbonate skeleton (available from BASF, product name "Tinuvin 292," having an N—$CH_3$ skeleton in the heterocycle, base dissociation constant pKb: 5.8) was used as substitute for the hindered amine-based compound CL represented by the above structural formula (B). A laminate including the light diffusion control film and a laminate as the display body using pseudo-external light were manufactured in the same manner as in Example 1 using the light diffusion control composition.

Comparative Example 3

The light diffusion control composition was prepared in the same manner as in Comparative Example 2 except that the compounding amount of the basic hindered amine-based compound having no carbonate skeleton (available from BASF, product name "Tinuvin 292," having an N—$CH_3$ skeleton in the heterocycle, base dissociation constant pKb: 5.8) was 2.0 mass parts. A laminate including the light diffusion control film and a laminate as the display body using pseudo-external light were manufactured in the same manner as in Example 1 using the light diffusion control composition.

Comparative Example 4

The light diffusion control composition was prepared in the same manner as in Example 1 except that 2.0 mass parts of a weakly basic hindered amine-based compound having no carbonate skeleton (available from BASF, product name "Tinuvin 123," having an N—O—$C_8H_{17}$ skeleton in the heterocycle, base dissociation constant pKb: 11.3) was used as substitute for the hindered amine-based compound CL represented by the above structural formula (B). A laminate including the light diffusion control film and a laminate as the display body using pseudo-external light were manufactured in the same manner as in Example 1 using the light diffusion control composition.

<Testing Example 1> (Measurement of Light Transmittance)

The pressure sensitive adhesive layer containing an ultraviolet (UV) absorber used in each of Examples and Comparative Examples was attached to a glass plate, and this was used as a sample. The light transmittance (%) of the sample was measured using an ultraviolet-visible-near infrared (UV-Vis-NIR) spectrophotometer (available from Shimadzu Corporation, product name "UV-3600"). The light transmittances at wavelengths of 380 nm, 480 nm, and 580 nm based on the results are listed in Table 1.

For the first PVC film used in each of Examples and Comparative Examples, the light transmittance (%) was measured in the same manner as above. The light transmittances at wavelengths of 380 nm, 480 nm, and 580 nm based on the results are listed in Table 1.

For the fluorine-based resin film used in each of Examples and Comparative Examples, the light transmittance (%) was measured in the same manner as above. The light transmittances at wavelengths of 380 nm, 480 nm, and 580 nm based on the results are listed in Table 1.

A laminate (laminate of four layers from the top) of the fluorine-based resin film, the pressure sensitive adhesive layer containing an ultraviolet absorber, the first PVC film, and the pressure sensitive adhesive layer containing an ultraviolet absorber prepared in each of Examples and Comparative Examples was attached to a glass plate via the latter pressure sensitive adhesive layer, and this was used as a sample. The light transmittance (%) of the sample was measured in the same manner as above. The light transmittances at wavelengths of 380 nm, 480 nm, and 580 nm based on the results are listed in Table 1.

For the laminate as the display body using pseudo-external light obtained in each of Examples and Comparative Examples, the light transmittance (%) was measured in the same manner as above. The light transmittances at a wavelength of 380 nm based on the results are listed in Table 2.

<Testing Example 2>(Measurement of Variable Haze Angle Range)

For the light diffusion control film used in each of Examples and Comparative Examples, the haze value (%) was measured using a variable haze meter (available from MURAKAMI COLOR RESEARCH LABORATORY, product name "HAZE METER HM-150N"). Specifically, the surface on the second PET film side of the laminate (second PET film/light diffusion control film/first PET film) including the light diffusion control film was irradiated with light rays while varying the incident angle with respect to the normal line of the surface within a range of −70° to 70° (range of ±700 from the normal line) along the longitudinal direction of the light diffusion control film, and the haze value (%) was measured at each incident angle. Details of the measurement conditions are as follows.

Light source: C light source

Measurement diameter: φ18 mm

Diameter of integrating sphere aperture: φ25.4 mm

Subsequently, for the results measured as above, the incident angle range in which the haze value was 90% or more was specified in the incident angle measurement range (−70° to 70°), and the difference between two angles at the end points of the range was calculated and determined as the angle range (variable haze angle range) giving a haze value of 90% or more. The results are listed in Table 2.

<Testing Example 3>(Measurement b*)

For the laminate as the display body using pseudo-external light obtained in each of Examples and Comparative Examples, the chromaticity b*0 defined by the CIE1976 L*a*b* color system was measured using an ultraviolet-visible-near infrared (UV-Vis-NIR) spectrophotometer (available from Shimadzu Corporation, product name "UV-3600"). The results are listed in Table 2.

Also for the laminate as the display body using pseudo-external light obtained in each of Examples and Comparative Examples, an accelerating test for leaving the laminate in a dry environment of 40° C. for 28 days was performed. For the laminate after that, the chromaticity b*1 was measured in the same manner as above. The results are listed in Table 2.

<Testing Example 4>(Evaluation of Liquefaction Suppression)

The laminate as the display body using pseudo-external light obtained in each of Examples and Comparative Examples was irradiated with ultraviolet rays for 3,000 hours (irradiance: 78.5 W/$m^2$) under an atmosphere of a temperature of 63±3° C. (black panel temperature) and 50% RH in accordance with JIS A1439: 2016 using a sunshine weather-ometer (SWOM) (available from Suga Test Instruments Co., Ltd., product name "S80"). Subsequently, the laminate was disassembled and the liquefaction of the light diffusion control film was examined. Then, the liquefaction suppression was evaluated based on the following evaluation criteria. The results are listed in Table 2.

<Evaluation Criteria for Liquefaction Suppression>

○ . . . Liquefaction did not occur at all.

Δ . . . When the light diffusion control film was peeled off from the PET films, the surface of the light diffusion control film was slightly sticky.

x . . . Liquefaction occurred in whole.

TABLE 1

| | Light transmittance (%) | | | |
|---|---|---|---|---|
| Wavelength (nm) | Pressure sensitive adhesive layer containing UV absorber | PVC film | Fluorine-based resin film | Laminate |
| 380 | 0.02 | 94.17 | 1.924 | 0.019 |
| 480 | 92.238 | 91.56 | 93.327 | 91.473 |
| 580 | 92.323 | 91.462 | 92.905 | 91.163 |

TABLE 2

| | Light transmittance at 380 nm (%) | Variable haze angle range (°) | Evaluation of liquefaction suppression | Before accelerating test b*0 | After accelerating test b*1 |
|---|---|---|---|---|---|
| Example 1 | 0.02 | 88.0 | ○ | −0.37 | −0.51 |
| Example 2 | 0.02 | 88.0 | ○ | −0.48 | −0.42 |
| Example 3 | 0.02 | 66.7 | ○ | −0.48 | −0.58 |
| Comparative Example 1 | 0.02 | 58.7 | x | −0.29 | −0.37 |
| Comparative Example 2 | 0.02 | 59.3 | x | −0.40 | −0.37 |
| Comparative Example 3 | 0.02 | 68.9 | ○ | 0.24 | 0.42 |
| Comparative Example 4 | 0.02 | 88.0 | x | −0.37 | −0.42 |

As can be found from Table 2, in the laminate as the display body using pseudo-external light obtained in each of Examples, the liquefaction of the light diffusion control film due to long-term ultraviolet irradiation and the yellowing due to the accelerating test (over time) were sufficiently suppressed.

INDUSTRIAL APPLICABILITY

The light diffusion control film and laminate according to the present invention can be suitably used, for example, for a window film intended to control the viewing angle, a display body using external light with improved visibility from a predetermined angle, and the like.

DESCRIPTION OF REFERENCE NUMERALS

1 . . . Light diffusion control film
11A . . . Column structure
111 . . . Columnar body having relatively high refractive index
112 . . . Region having relatively low refractive index
11B . . . Louver structure
113 . . . Plate-like region having relatively high refractive index
114 . . . Region having relatively low refractive index
2 . . . Window film
211 . . . Hard coat layer
21*a*, 21*b*, 21*c* . . . Transparent resin film
22*a*, 22*b* . . . Pressure sensitive adhesive layer containing ultraviolet absorber
20 . . . Window glass 2
3 . . . Display body using external light
31*a*, 31*b*, 31*c*, 31*d*, 31*e* . . . Transparent resin film
32*a*, 32*b* . . . Pressure sensitive adhesive layer containing ultraviolet absorber
33 . . . Decorative layer
34*a*, 34*b* . . . Pressure sensitive adhesive layer
35 . . . Reflective layer
30 . . . Base material (frame member)

The invention claimed is:

1. A laminate used under an environment irradiated with external light, the laminate comprising:
a light diffusion control film having an internal structure in the film, the internal structure comprising a plurality of regions having a relatively high refractive index in a region having a relatively low refractive index; and
an ultraviolet absorbing layer located further on an external light incident side than the light diffusion control film,
wherein the ultraviolet absorbing layer covers an entire surface of the light diffusion control film,
the ultraviolet absorbing layer is a pressure sensitive adhesive layer that contains an ultraviolet absorber,
the light diffusion control film containing a weakly basic hindered amine-based compound having a carbonate skeleton, and
the light transmittance of the ultraviolet absorbing layer at a wavelength of 380 nm is 1% or less.

2. The laminate according to claim 1, wherein a content of the weakly basic hindered amine-based compound having the carbonate skeleton is 0.01 mass % or more and 10 mass % or less in the light diffusion control film.

3. The laminate according to claim 1, wherein the light diffusion control film is obtained from a composition that contains a high refractive index component, a low refractive index component having a refractive index lower than that of the high refractive index component, and the weakly basic hindered amine-based compound having the carbonate skeleton.

4. The laminate according to claim 1, wherein the laminate is a window film.

5. The laminate according to claim 4, comprising ultraviolet absorbing layers on both sides of the light diffusion control film.

6. The laminate according to claim 1, wherein the laminate is a display body using external light.

7. A light diffusion control film used in a laminate used under an environment irradiated with external light, the laminate comprising the light diffusion control film and an ultraviolet absorbing layer located further on an external light incident side than the light diffusion control film,
wherein the ultraviolet absorbing layer covers an entire surface of the light diffusion control film,
the ultraviolet absorbing layer is a pressure sensitive adhesive layer that contains an ultraviolet absorber,
the light diffusion control film having an internal structure in the film, the internal structure comprising a plurality of regions having a relatively high refractive index in a region having a relatively low refractive index,
the light diffusion control film containing a weakly basic hindered amine-based compound having a carbonate skeleton, and
the light transmittance of the ultraviolet absorbing layer at a wavelength of 380 nm is 1% or less.

8. The laminate according to claim 1, wherein the weakly basic hindered amine-based compound having the carbonate skeleton is a compound that includes at least one skeleton represented by the following general formula (I):

(I)

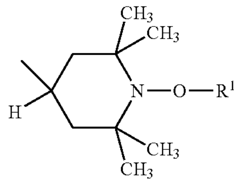

wherein $R^1$ in the above general formula (I) is an alkyl group.

9. The laminate according to claim 1, wherein the laminate does not include a (meth)acrylic ester that contains a plurality of aromatic rings.

10. The light diffusion control film according to claim 7, wherein the weakly basic hindered amine-based compound having the carbonate skeleton is a compound that includes at least one skeleton represented by the following general formula (I):

(I)

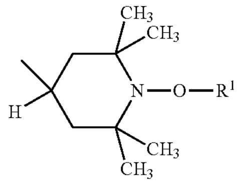

wherein $R^1$ in the above general formula (I) is an alkyl group.

11. The light diffusion control film according to claim 7, wherein the light diffusion control film does not include a (meth)acrylic ester that contains a plurality of aromatic rings.

* * * * *